July 8, 1930.   G. E. WEST   1,770,093
MILK BOTTLE
Filed Feb. 15, 1929
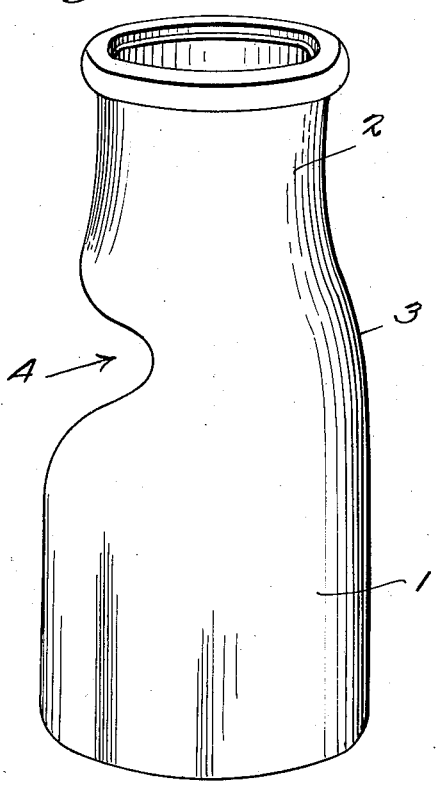
Fig. 1.
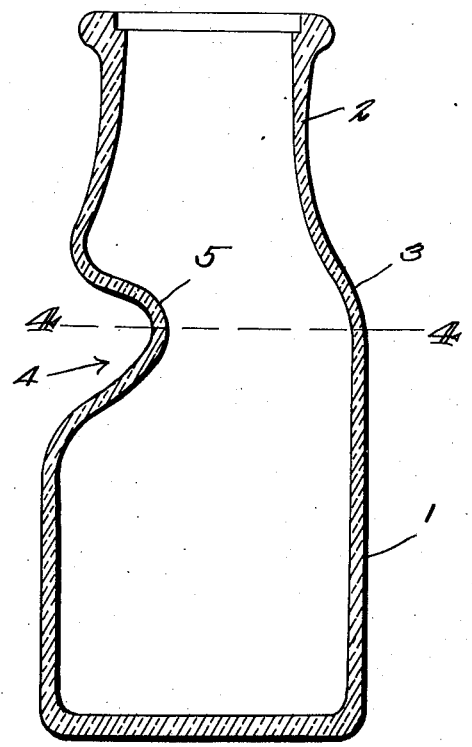
Fig. 2.
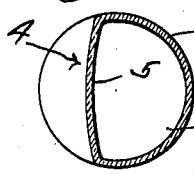
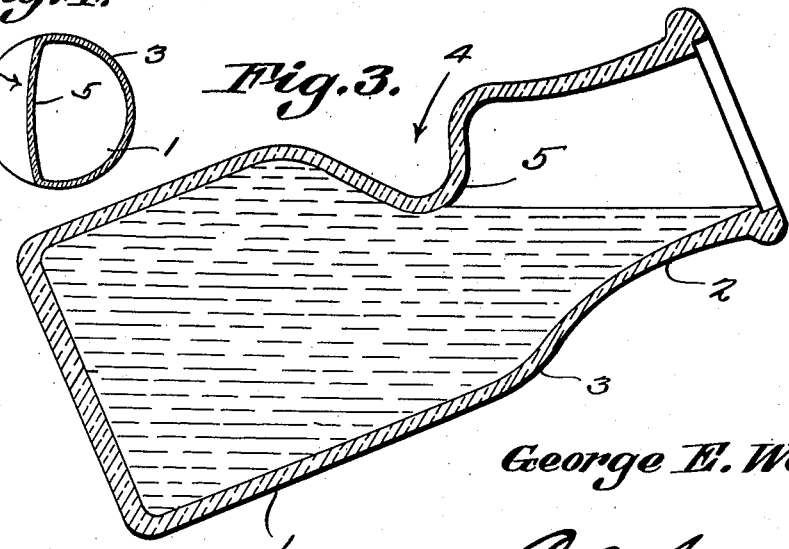
Fig. 4.
Fig. 3.
George E. West
Inventor
By C A Snow & Co.
Attorneys.

Patented July 8, 1930

1,770,093

UNITED STATES PATENT OFFICE

GEORGE E. WEST, OF VAN BUREN, ARKANSAS, ASSIGNOR TO CREAM SEPARATOR BOTTLE, INC., A CORPORATION OF DELAWARE

MILK BOTTLE

Application filed February 15, 1929. Serial No. 340,131.

This invention aims to provide a novel milk bottle so constructed as to hold back the milk whilst the cream in the bottle is being poured off.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in perspective, a milk bottle constructed in accordance with the invention; Figure 2 is a longitudinal section; Figure 3 is a longitudinal section wherein the bottle has been tilted; Figure 4 is a section on the line 4—4 of Figure 2.

The bottle claimed may be made of glass, or any other suitable material, and includes a cylindrical body 1, and a reduced tapered neck 2 which is circular in cross section, the place of juncture between the body and the neck being marked by the numeral 3. Opposite to the point 3, the bottle is indented at 4, entirely across, from side to side, to form an inwardly extended milk-retaining shoulder 5, the remainder of the periphery of the bottle being convexed away from the shoulder, and retaining its original contour.

When the bottle is tilted, the cream will run off, and the milk will be held back by the shoulder 5, it being practically possible to pour off all of the cream, without any appreciable intermingling of cream and milk.

When a milk bottle is contracted throughout its entire periphery, the bottle is weakened, because it has a more or less spindling portion joining the body with the mouth portion of the bottle: there is no such weakness in the bottle shown in the drawings. The bottle that forms the subject matter of this application is easier to clean than other special cream-pouring bottles, and is less costly to manufacture. The specific structure shown in the drawings holds back practically all of the milk until substantially all of the cream has been poured off. Another advantage of the present invention is that it keeps the standard form of milk bottle pretty much intact, and does not call for new crates, bottle-handling machinery, or capping devices.

I claim:—

A bottle for separating cream from milk during the pouring-off of the cream, comprising a body, and a reduced neck joined directly to the body, the body and the neck being arranged symmetrically with respect to the longitudinal axis of the bottle, one side of the bottle being plain, and the opposite side of the bottle being provided with an internal transverse shoulder extended inwardly beyond a longitudinal line parallel to the axis of the bottle and touching one edge of the mouth of the bottle, the shoulder terminating between the axis of the bottle and that side of the bottle from which the shoulder projects, the upper surface of the shoulder being downwardly and inwardly inclined, the lower surface of the shoulder being downwardly and outwardly inclined, the space between the inner edge of the shoulder and said plain side of the bottle being wider than the mouth of the bottle, and there being curved, concaved surfaces where the shoulder joins the wall of the bottle, said surfaces being curved with such concavity as to avoid appreciable lodgment of hardened milk and to promote cleaning.

In testimony that I claim the foregoing as my own, I have hereto affixed my signature.

GEORGE E. WEST.